United States Patent Office 3,592,815
Patented July 13, 1971

3,592,815
PROCESS FOR PREPARING A PIPERAZINE SALT OF DIPHENYL-1,2-BUTYL-4-DIOXO 3,5-PYRAZOLIDINE
Jean Marie Charles De Muylder, 49 Avenue Reine Astrid, Crainhem, Belgium
Filed July 7, 1967, Ser. No. 651,869
Claims priority, application Belgium, May 9, 1967, 43,432
Int. Cl. C07d 51/64
U.S. Cl. 260—268    4 Claims

ABSTRACT OF THE DISCLOSURE

A piperazine salt of diphenyl-1,2-butyl-4-dioxo 3,5-pyrazolidine of the formula

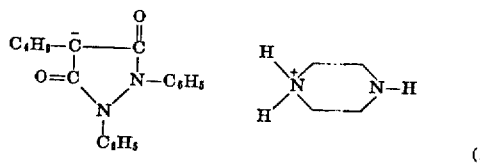

is produced by dissolving in a solvent such as acetone or methanol, piperazine and the pyrazolidine with the piperazine in stoichiometric excess, at about 30° C. The obtained solution is poured into a solvent such as hexane or ethyl ether to precipitate the salt.

---

This invention relates to a method for preparing a derivative of a substituted pyrazolidine, namely a piperazine salt of diphenyl-1,2-butyl-4-dioxo-3,5-pyrazolidine of the following formula:

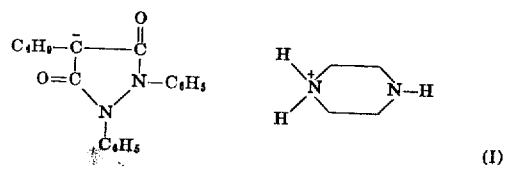

According to this invention, (1) piperazine and diphenyl-1,2-btuyl-4-dioxo-3,5-pyrazolidine are dissolved in a solvent in which the desired salt is also soluble and (2) the desired salt is precipitated by pouring the obtained solution into a solvent in which said salt is insoluble.

The solvent used in the first step (1) of the method may be, for example, acetone or methanol in which the starting reagents as well as the desired salt are soluble, whereas hexane or ether may be used as precipitating solvent in the second step (2) of the method.

The precipitation may suitably take place by stirring the reaction mixture in the precipitating solvent at a temperature near to the room temperature, for example at a temperature of about 30° C.

An excess of piperazine in respect of the stoichiometric proportions or piperazine and diphenyl-1,2-butyl-4-dioxo-3,5-pyrazolidine is preferably used.

The method according to this invention is illustrated by the following examples.

EXAMPLE 1

Figure 1:
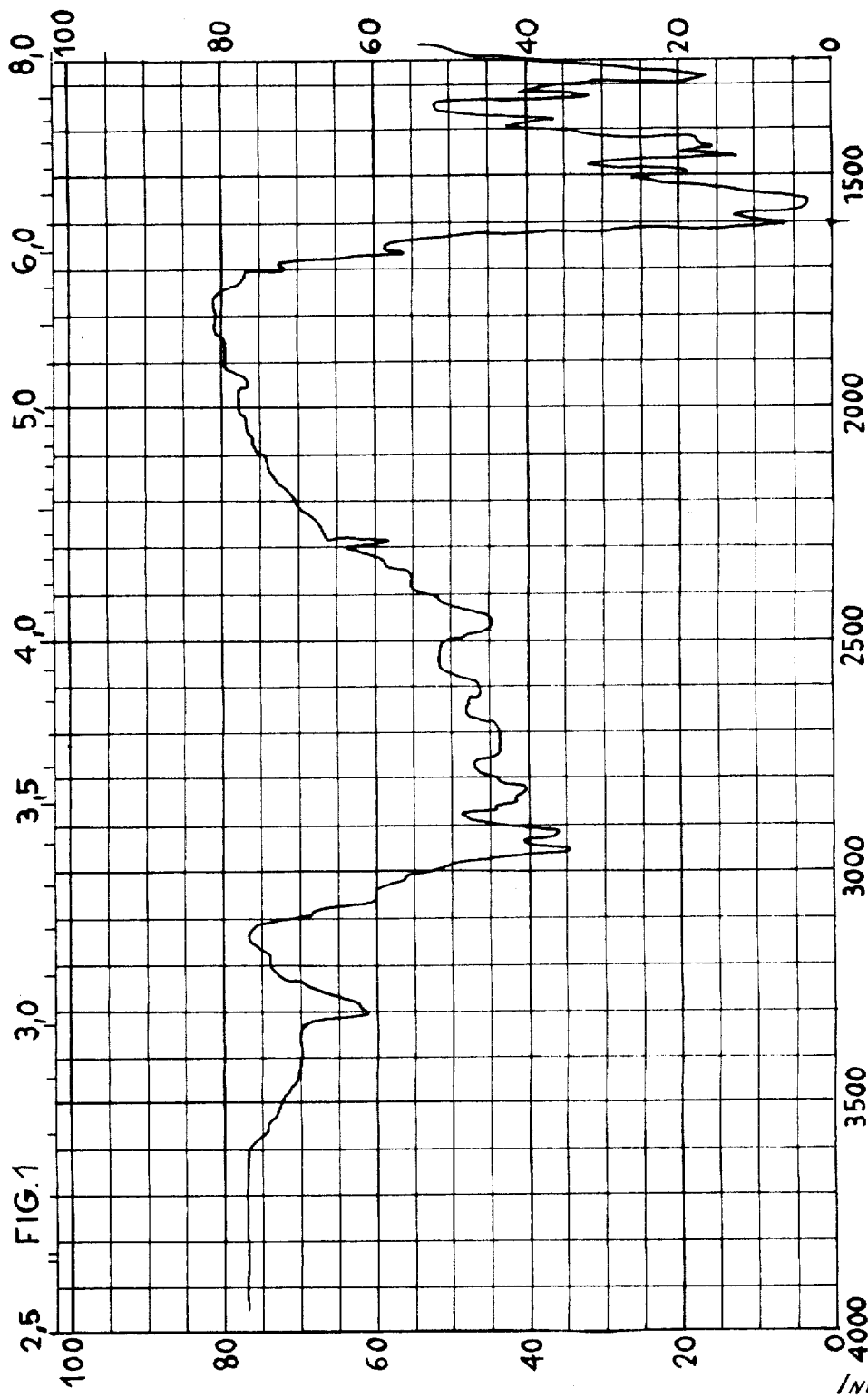
Figure 2:
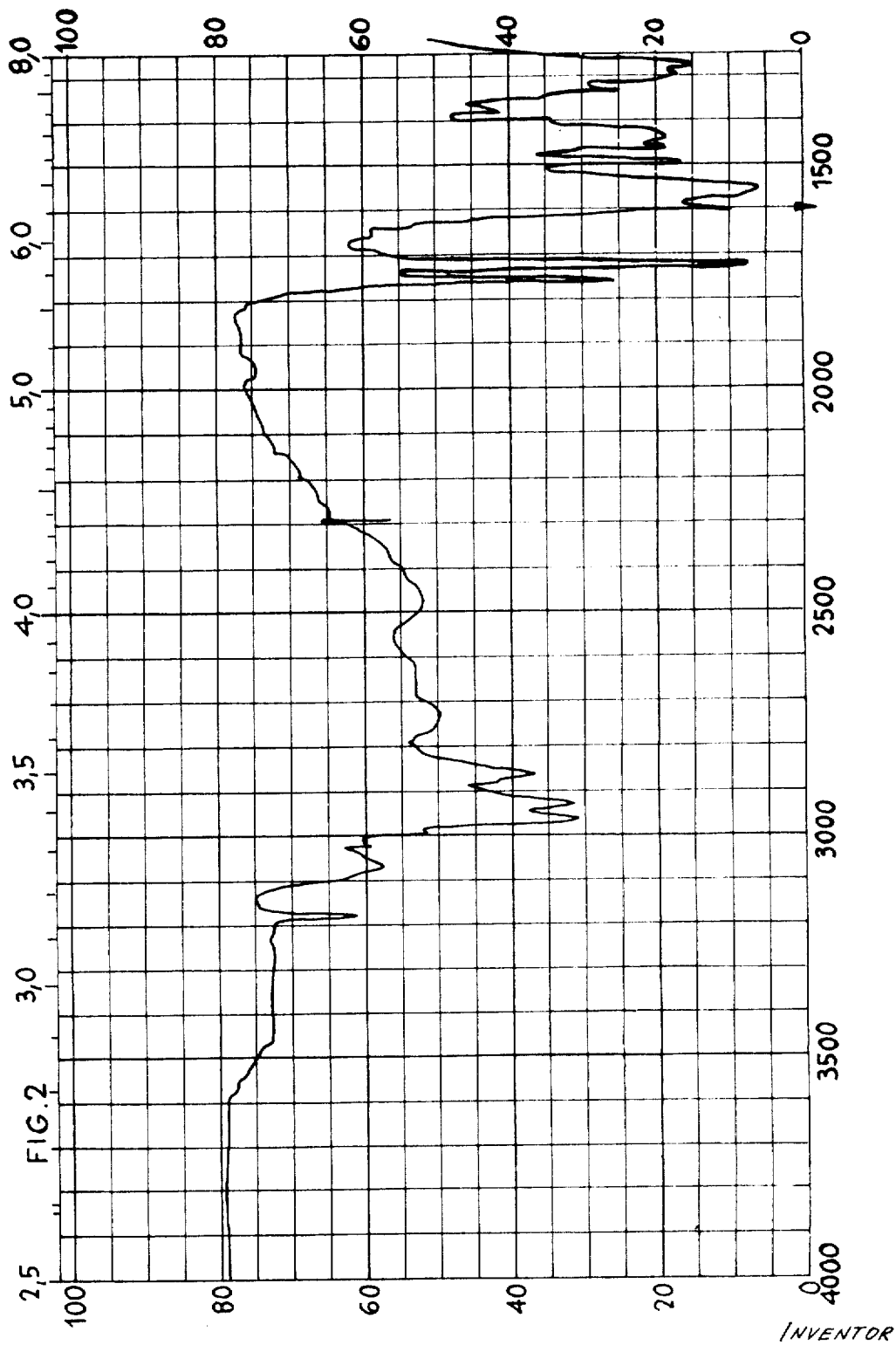

100 milligrams of diphenyl-1,2-butyl-4-dioxo-3,5-pyrazolidine and 550 milligrams of monohydrated piperazine are dissolved in 20 millilitres of acetone. The obtained solution is poured into 40 millilitres of hexane, with stirring, at a temperature of 30° C. An oily precipitate is immediately obtained, said precipitate crystallizing quickly. After filtration and washing with hexane, 1,100 milligrams of white crystals of the salt of Formula I melting at 134–138° C. are obtained. The analysis of said salt shows that it contains 78.5% of diphenyl-1,2-butyl-4-dioxo-3,5-pyrazolidine and 21.5% of piperazine. The infrared spectrum of the compound represented on FIG. 1 shows a characteristic band at 3,320 cm.$^{-1}$. On the contrary, the infrared spectrum of a mere mixture of diphenyl-1,2-butyl-4-dioxo-3,5-pyrazolidine and piperazine, represented on FIG. 2, does not show any band at 3,320 cm.$^{-1}$.

EXAMPLE 2

By using the same method as in Example 1, except that 700 milligrams of piperazine instead of 500 milligrams of the same product are used, 1,140 milligrams of the desired salt melting at 134–138° C. are obtained.

EXAMPLE 3

By using the method described in Example 1, except that methanol is used instead of acetone and that ether is used instead of hexane, the desired salt of the Formula I is obtained with the same yield.

The salt of Formula I is a pharmaceutical product which shows unexpected and substantial advantages, if compared to diphenyl-1,2-butyl-4-dioxo-3,5-pyrazolidine. Tests in vivo on animals and human beings have shown that the salt of the Formula I is substantially less toxic than diphenyl-1,2-butyl-4-dioxo-3,5-pyrazolidine, whereas the tolerance of said salt is substantially better. Moreover, while the administration of diphenyl-1,2-butyl-4-dioxo-3,5-pyrazolidine to human beings causes a substantial decrease of the excretion of electrolytes, it has been found that said excretion is normal when the salt of Formula I is administered. Accordingly, the salt may be administered during a longer period and at higher doses, without the necessity of imposing a salt free or salt poor diet to the patient.

It has also been found that the salt of Formula I acts much more quickly than the base pyrazolidine administered alone.

What I claim is:

1. A method for the preparation of a piperazine salt of diphenyl-1,2-butyl-4-dioxo-3,5-pyrazolidine of the formula:

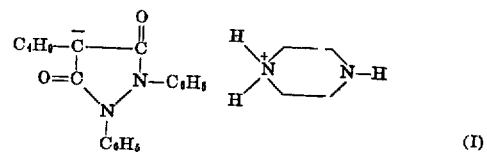

comprising (1) dissolving piperazine and diphenyl-1,2-butyl-4-dioxo-3,5-pyrazolidine in a solvent in which the desired salt is also soluble with the piperazine in stoichiometric excess relative to the diphenyl-1,2-butyl-4-dioxo-3,5-pyrazolidine and (2) pouring the obtained solution into a solvent in which the desired salt is insoluble, while stirring at a temperature near to room temperature until the desired salt precipitates.

2. A method according to claim 1, in which acetone is the solvent used in the first step (1) and hexane is the solvent used in the second step (2).

3. A method according to claim 1, in which methanol is the solvent used in the first step (1) and ethyl ether is the solvent used in the second step (2).

4. A method according to claim 1, in which the reaction mixture is stirred in the precipitating solvent at a temperature of about 30° C.

References Cited

UNITED STATES PATENTS

| 2,562,830 | 7/1951 | Stenzl | 260—310 |
| 3,257,403 | 6/1966 | Pfister et al. | 260—268 |
| 3,325,509 | 6/1967 | Pfister et al. | 260—310 |

ALEX MAZEL, Primary Examiner

R. V. RUSH, Assistant Examiner

U.S. Cl. X.R.

260—310B, 999